(12) United States Patent
Clarke et al.

(10) Patent No.: US 6,283,868 B1
(45) Date of Patent: Sep. 4, 2001

(54) FLEXIBLE SHAFT COUPLING ELEMENT AND FLEXIBLE COUPLINGS INCORPORATING SAME

(75) Inventors: Arthur Jack Clarke; Kevin John Francis Whitfield, both of Dumfriesshire (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/335,380

(22) Filed: Jun. 17, 1999

(30) Foreign Application Priority Data

Jun. 17, 1998 (EP) .................................................. 98304804

(51) Int. Cl.⁷ ....................................................... F16D 3/52
(52) U.S. Cl. .............................. 464/88; 464/903; 156/137
(58) Field of Search ..................................... 156/137, 140, 156/141; 464/73, 74, 75, 88, 154, 157, 903

(56) References Cited

U.S. PATENT DOCUMENTS

| | | |
|---|---|---|
| 2,867,103 | 1/1959 | Williams . |
| 2,918,809 * | 12/1959 | Miller .................................... 464/903 |
| 2,952,143 * | 9/1960 | Case ........................................ 464/88 |
| 3,464,875 * | 9/1969 | Brooks et al. ......................... 156/140 |
| 4,357,137 * | 11/1982 | Brown ...................................... 464/75 |
| 5,292,474 * | 3/1994 | Thomas .................................. 156/140 |
| 5,378,202 | 1/1995 | Swinderman . |
| 5,427,728 * | 6/1995 | Beck et al. ............................. 156/140 |
| 5,908,355 * | 6/1999 | Hoyt, III et al. ...................... 464/464 |

FOREIGN PATENT DOCUMENTS

| | | |
|---|---|---|
| 9308521 U | 9/1993 | (DE) . |
| 0 280 175 | 8/1988 | (EP) . |
| 1203905 | 1/1960 | (FR) . |
| 879493 | 10/1961 | (GB) . |
| 893521 | 4/1962 | (GB) . |
| 63-072940 | 2/1988 | (JP) . |

* cited by examiner

Primary Examiner—Lynne H. Browne
Assistant Examiner—Aaron M. Dunwoody
(74) Attorney, Agent, or Firm—M. S. Olson, Esq.; C. H. Castleman, Esq.; S. G. Austin, Esq.

(57) ABSTRACT

A flexible shaft coupling element comprising a sleeve shaped body having a central annular portion and a coupling receiving portion at each of two opposing sleeve ends. The coupling receiving portions include axially extending teeth on their inner surfaces. The flexible shaft coupling element is characterized in that the annular portion possesses a torsional shear capacity and the area defining the axially extending teeth possesses a shear capacity, and the tooth shear capacity exceeds the annular portion torsional shear capacity.

13 Claims, 4 Drawing Sheets

FLEXIBLE SHAFT COUPLING ELEMENT AND FLEXIBLE COUPLINGS INCORPORATING SAME

BACKGROUND OF THE INVENTION

The present invention relates to a flexible shaft coupling element and flexible couplings incorporating such element. The flexible shaft coupling element is in the form of a flexible sleeve-shaped body comprising an annular portion and two coupling receiving portions on opposing sleeve ends at either end of the annular portion. Each of the coupling receiving portions includes a plurality of axially extending ribs or teeth along at least a portion of the inner periphery of the sleeve-shaped body for slidably meshing with grooves in oppositely disposed hubs or end pieces. Such couplings are used to connect two rotating shafts which may be coupled to the end pieces. The flexible shaft coupling of the present invention is useful for accommodating misalignment of two shafts to be coupled together, and for providing a silently operating driving connection between the shafts by virtue of its flexible annular portion or band and the resiliency of its ribs or teeth.

Heretofore, flexible shaft couplings comprising a flexible load carrying band or annular portion and coupling receiving portions having axially extending ribs for engaging axially extending grooves on oppositely disposed hubs or end pieces were characterized in that such ribs typically possessed a trapezoidal profile or contour, and mated with complementary contoured grooves in the generally rigid end pieces. The ribs of such elements are characteristically elastomeric and the end pieces against which the ribs bear are characteristically formed of metal, resulting in a disproportionate amount of strain on the elastomeric ribs vis-a-vis the end piece grooves.

Improvements in the design of these coupling elements have generally been directed toward strengthening the load carrying band to withstand ever greater torsional loading. Because the load bearing capability of such load carrying bands has steadily increased as a result of such improvements, the elastomeric ribs have been required to bear ever-increasing torsional strain.

Flexible shaft coupling devices of the prior art thus generally exhibit a characteristic failure mode, consisting of the ripping or shearing-off of one or more of the teeth from the inner periphery of the sleeve body due to the effect of torsional stress or applied load. Typically, not just one of the teeth would be sheared off in this way, but the entire tooth profile would be sheared away from the much higher strength load carrying backing of the coupling element, leaving a smooth, empty sleeve-shaped shell in the area of one or both coupling receiving portions. Thus, despite the increased strength of prior art coupling element sleeve bodies, such elements generally experienced premature failure due to the effects of torsional loading on the teeth.

This failure mode is moreover particularly troublesome since such shearing-off of the teeth is not apparent from a view of the outer surface of the coupling. One cannot ascertain the levels of torque being transmitted or the proportion of useful life remaining in the coupling without first stopping the drive, removing the elastomeric sleeve, and then performing a visual inspection of the tooth portion of the coupling element. At minimum, this decreases production output and increases engineering costs. Worse yet, very often the first indication of failure may be the total destruction of the coupling element.

SUMMARY OF THE INVENTION

Accordingly, it is a primary object of the present invention to provide a flexible shaft coupling element which exhibits increased load capacity over prior art designs, and which substantially avoids premature failure of the ribs due to torsional loading.

It is a further object of the present invention to provide such a device which exhibits improved resistance to slippage during operation.

It is yet another object of the present invention to provide such a device which provides an early indication of the condition of the coupling without the requirement of halting of coupling operation or removal and subsequent inspection of the coupling.

To achieve the foregoing and other objects and in accordance with a purpose of the present invention as embodied and broadly described herein, flexible shaft coupling elements, and flexible shaft coupling devices incorporating such elements are provided. A flexible shaft coupling element of the present invention is in the form of a substantially flexible sleeve-shaped body comprising an annular portion; at least two coupling receiving portions, each such receiving portion being coaxial with said annular portion and terminating at one of two opposing ends thereof, a sleeve body inner periphery or surface and a sleeve body outer periphery or surface. The coupling receiving portions each comprise a plurality of axially extending teeth or ribs arranged along at least a portion of the inner periphery of the sleeve-shaped body. Each tooth has a circumferential width spanning a portion or arc of the coupling receiving portion's inner surface.

Each of the teeth has an active axial length which, in conjunction with each circumferential width, defines a tooth shear area. The sum of these areas, or cumulative tooth shear area, possesses a cumulative tooth shear capacity. The annular portion also possesses a shear capacity, which is primarily torsional in nature and is distinct from the cumulative tooth shear capacity. The invention is characterized in that the cumulative tooth shear capacity exceeds the annular portion torsional shear capacity.

What is meant by the term "shear capacity" in this context is the resistance of a given material to the combined effects of the applied load (both torsional and non-torsional), vibration, frequency, amplitude, high and low temperature and time, as manifested in the material's ability to substantially maintain its structural integrity sufficiently to operate successfully in its intended application. Thus, in comparing the shear capacity of two materials subject to similar torsional loading, vibration, etc., the material having a lesser shear capacity would generally exhibit failure prior to the material having a greater shear capacity. This characteristic is discussed in greater detail below.

By exhibiting a cumulative tooth shear capacity greater than an annular portion torsional shear capacity, the flexible coupling elements of the present invention overcome disadvantages posed by prior art; premature failure of the teeth is substantially avoided. The flexible coupling elements moreover exhibit improved load capacities over prior art couplings. What is meant by the term, "load capacity" in this context is the capacity of the device to withstand or resist the overall applied force to which it is subjected in use. Load capacity in this context moreover includes both torque transmission, amplitude and frequency components.

In a further embodiment, a flexible coupling assembly is provided, comprising an element as described above, and moreover comprising at least two end pieces having grooves complementary to the teeth of the flexible coupling element coupling receiving portions for mating therewith, one each of such end pieces being engaged in a coupling receiving portion for further engagement to one of at least two shafts.

In yet another embodiment, a flexible coupling element is provided as noted above, moreover comprising means on the outer surface of the sleeve-shaped body for indicating the level of torque being transmitted to the coupling element at a given time.

BRIEF DESCRIPTION OF THE DRAWINGS

The accompanying drawings which are incorporated in and form a part of the specification, illustrate preferred embodiments of the invention, and together with a description, serve to explain the principles of the invention. In the several drawings, like numerals designate like parts, and.

DETAILED DESCRIPTION

Figure 1:
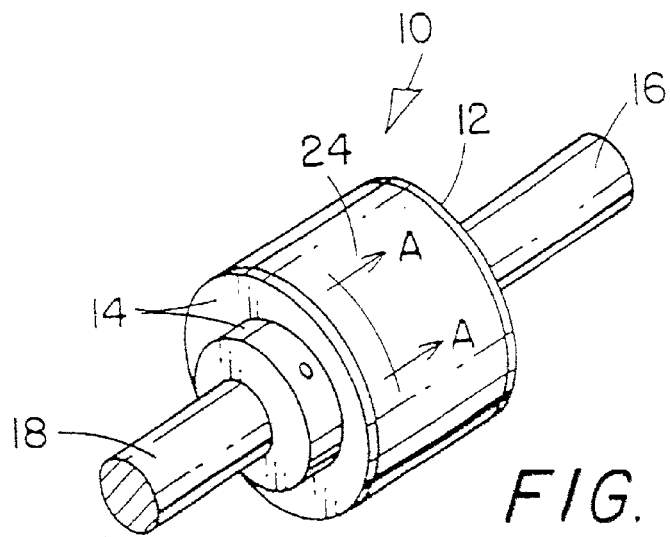
FIG. 1 is a perspective view of a flexible shaft coupling device of the prior art.
Figure 2:
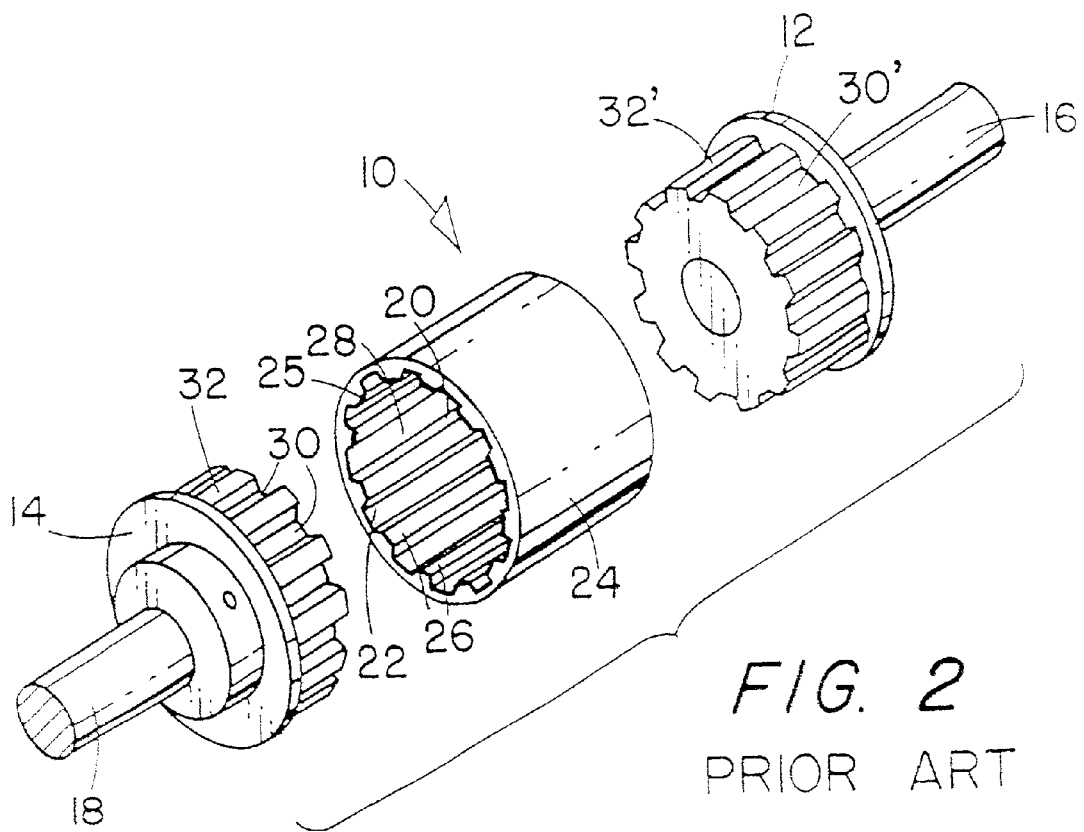
FIG. 2 is an exploded perspective view of the flexible shaft coupling device of the prior art shown in FIG. 1.

A flexible shaft coupling device of the prior art is shown in FIG. 1, and the parts in exploded view of illustrated in FIG. 2, wherein the coupling assembly 10 comprises oppositely disposed end pieces 12, 14 to which oppositely disposed shafts 16, 18 are engaged by any suitable means. The end pieces 12, 14 are coupled to the coupling receiving portions 20, 22 of the flexible coupling element 24. The coupling receiving portions 20, 22 are characterized by evenly spaced axially extending trapezoidal shaped ribs or teeth 26 on the sleeve-shaped body's inner periphery 28 which are formed and adapted to mesh with complementary grooves 30, 30 on the outer surface 32, 32 of the end pieces 12, 14.

The flexible coupling element 24 furthermore generally includes a wear resistant fabric cover 25 along its inner periphery 28, which is bonded to at least a portion of the teeth 26.

Figure 3:
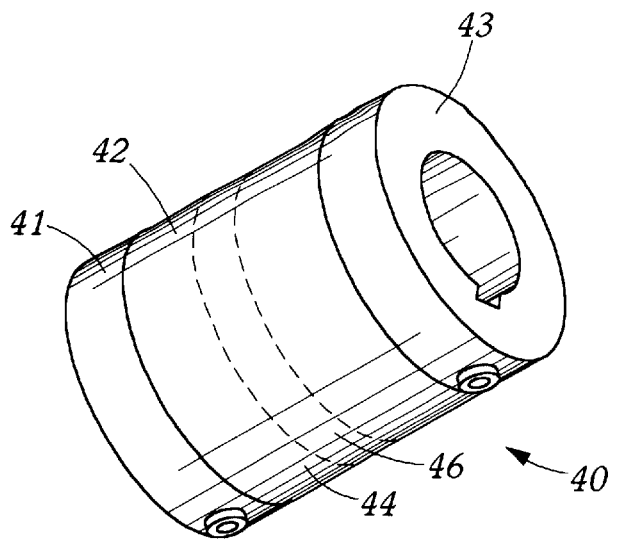
FIG. 3 is a perspective view of one embodiment of the present invention in the form of a flexible coupling device.
Figure 4:
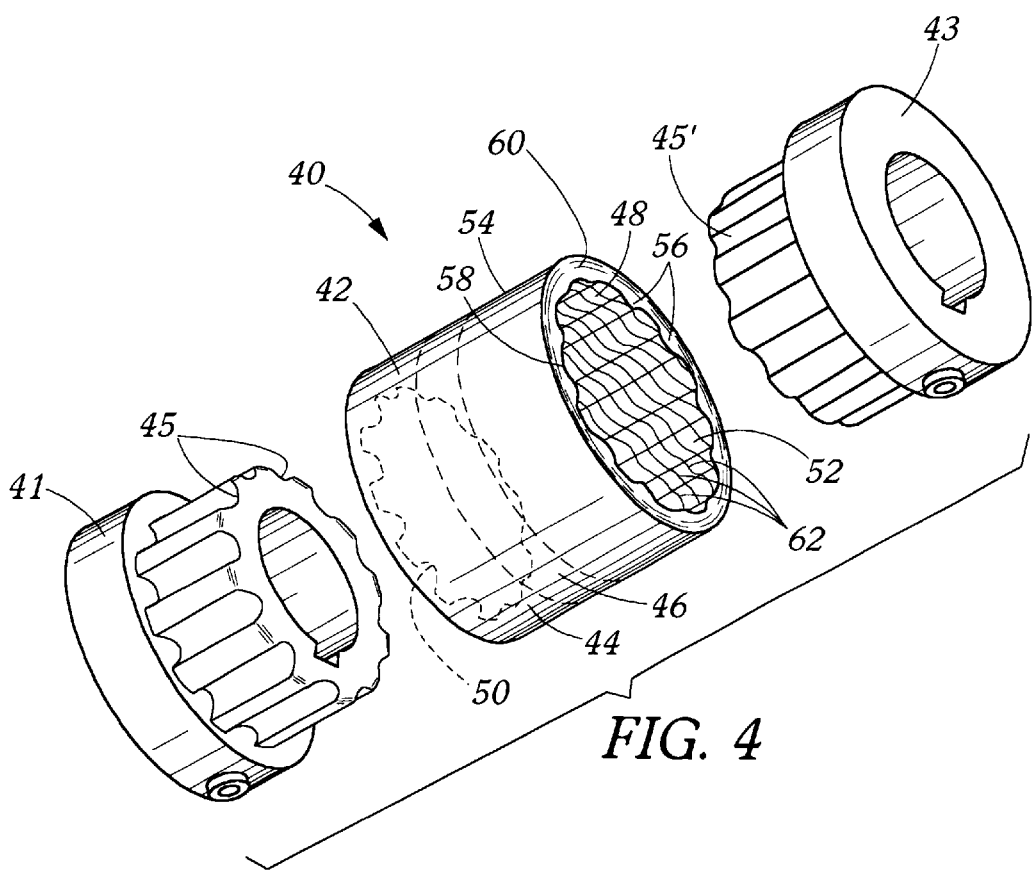
FIG. 4 is an exploded perspective view of the embodiment of the present invention shown in FIG. 3.

Referring to FIGS. 3 and 4, a perspective view of one embodiment of the present invention in the form of a flexible shaft coupling device 40 is shown. The device comprises a flexible coupling element 42 comprising a substantially flexible sleeve-shaped body 44, as well as two oppositely disposed end pieces 41, 43 to which oppositely disposed shafts (not shown) may be engaged by any suitable means. The body 44 comprises an annular portion 46, and at least two opposing sleeve ends on either side of the annular portion 46 defining respective coupling receiving portions 48, 50 for engagement with the end pieces 41, 43. The sleeve shaped body 44 has both an inner periphery 52 or surface and an outer periphery 54 or surface. The coupling receiving portions 48, 50 comprise a plurality of axially extending ribs or teeth 56 arranged along at least a portion of the inner periphery 52 of the sleeve-shaped body 44. Each tooth 56 has a circumferential width 65 spanning a portion or arc of the inner periphery 52. The end pieces 41, 43 possess axially extending grooves 45 along their inner peripheries, which grooves are formed to substantially mate with the teeth 56 of the coupling receiving portions 48, 50.

The sleeve shaped body 44 may furthermore include a wear resistant fabric cover 58 along its inner periphery 52, which may be bonded to at least a portion of the teeth 56 as shown to increase the wear resistance thereof. The inner surface 52 of the sleeve shaped body may furthermore include a reinforcement cord 62 helically wound, or otherwise applied, to the elastomer surface. This cord 62 may be formed of any suitable material, including glass, aramid and nylon, and is preferably formed of fiberglass.

Each of the teeth 56 extends along at least a portion of the sleeve body inner surface 52, but need not necessarily extend along the entire inner surface thereof, and presents an area defined generally by its circumferential width and its active axial length. The sum of the tooth areas, or cumulative tooth shear area, possesses a cumulative tooth shear capacity. The annular portion 46 also possesses a shear capacity which is torsional in nature. The invention is characterized in that the cumulative tooth shear capacity exceeds the annular portion torsional shear capacity.

What is meant by the term "shear capacity" in the context of this disclosure is a given body's resistance to the combined effects of exposure to loading (torsional or nontorsional), vibrational frequency and amplitude, temperature and time. The maximum shear capacity of such body is evidenced by catastrophic shear strain, or the deformation and ultimate failure of the body as a result of the progressive relative displacement of two or more contiguous parts or layers of the body brought about by a force exerted in a direction generally parallel to such layer's plane of contact.

The axial tooth lengths are termed "active" within the context of this disclosure, for a number of reasons. First, the terminal ends of the teeth may optionally be and are preferably rounded or curved to define transition areas between the coupling receiving portion teeth and the rigid end piece grooves to which the teeth are engaged, which accommodate flexing and vibration between the component parts in that area. Second, because the shear capacity of the total tooth area exceeds the shear capacity of the annular portion according to the present invention, it has been surprisingly found that in some applications, the flexible coupling element teeth need not extend across the entire annular portion length. That is, the increased tooth shear capacity compared to the shear capacity of the annular portion makes it possible to design and manufacture viable coupling elements in which the coupling receiving portion teeth fully engage the grooves of the rigid end pieces, but do not necessarily span the length of the annular portion inner surface. Of course, in such cases the tooth length must nonetheless be sufficient to accommodate the application's loading.

The flexible coupling elements of the present invention, including the tooth members thereof, may be formed of any suitable flexible material, and are preferably formed of an elastomeric material, including cured compounds of polychloroprene, natural rubber, polybutadiene, copolymers of styrene and butadiene, copolymers of isobutylene and isoprene, polyether or polyester urethanes, acrylic elastomers and chloro-sulphonated polymers and copolymers of ethylene, or suitable blends of the foregoing. In a preferred embodiment, the flexible coupling element is formed of a polychloroprene compound. Any such elastomeric compound for use in the present invention may moreover include other optional ingredients which are all well known to the art, including fillers, reinforcing agents, cure agents, accelerators, processing aids, extender oils etc., in proportions suitable for a given application. For example, fillers and reinforcing agents including but not limited to carbon black, silica, talc and calcium carbonate may be used in amounts of from about 0 to about 500 or more parts per hundred weight of elastomer ("phr"); curing agents including but not limited to sulfur and free-radical-forming agents may be utilized in amounts of from about 0.01 to about 10 phr.

The flexible elements may include a wear resistant cover element 58 which may be formed of any suitable textile material including nylon, aramid, polyester or mixtures of the foregoing and is preferably nylon 6,6. The fabric may be of any suitable weave including plain, twill or satin weaves in stretch or non-stretch forms. In a preferred embodiment, the wear resistant cover element is a twill weave with between 40% and 100% stretch in the weft direction. The fabric preferably has a weight of from between about 25 and about 500 g/m$^2$, more preferably of from between about 50 and about 300 g/m$^2$, and is preferably treated with a rubber-based cement compatible with the base elastomeric compound, or a suitable resorcinol formaldehyde latex-based adhesive system to yield a final treated fabric weight of from about 50 to about 1000 g/m$^2$, more preferably between about 100 and 700 g/m$^2$.

The flexible coupling element may optionally include a tensile member 62 or tensile element. Such tensile element may be formed from any suitable material such as aramid fibers, including meta- or para-aramids, polyester fibers, polyamide fibers, cellulose fibers (e.g., rayon), carbon fibers, acrylic fibers, polyurethane fibers, cotton fibers and glass fibers, as well as mixtures of the foregoing, and are preferably formed of fiberglass. The number and diameter of such tensile member is dependent upon the size of the coupling and the application for which it is intended. The tensile member may moreover be of any conventional form, but is preferably in the form of strain-resisting cords. The fibers may be prepared in a manner to yield a construction of from about 2 to about 100 strands/inch (0.8 to 39 strands/cm), more preferably of from about 5 to about 80 strands/inch (2 to 32 strands/cm), and most preferably of from about 8 to about 56 strands/inch (3 to 22 strands/cm).

The flexible element may optionally, and is preferably, fiber loaded. It has been surprisingly found that the load carrying capacity or life of the coupling, and/or its torsional stiffness can be significantly improved by the addition of fibers to the elastomeric sleeve in such a way that a substantial number of the fibers 60 are oriented circumferentially about the sleeve, and may generally follow the contour of the ribs or teeth 56. This characteristic is shown, for example in FIG. 4. As a non-limiting example, such fibers may be so aligned in the rubber calendaring process; as the rubber band is processed through the calendaring equipment, at least a substantial proportion of the fibers present in the compound tend to align themselves or "flow" in the direction in which the rubber is calendared. Thus, the proper calendaring direction for a given coupling element, i.e., that which would result in a significant number of fibers aligned in circumferential configuration about the flexible coupling element, may be suitably selected.

Alternatively, the fibers may be aligned to the plane of maximum shear stress in the coupling. In some cases the addition of such fibers eliminates the need for a textile reinforcement fabric on the inner surface of the sleeve body and/or the reinforcement cord. This is especially so in the case of generally smaller coupling devices for use in relatively low loading applications of, e.g., below operating loads of about 5 Nm, but it is foreseeable that such benefit may also extend to larger devices for use in higher loading applications.

Typical fibers that can be used for this purpose are aramid fibers, including meta- or para-aramids, polyester fibers, polyamide fibers, cellulose fibers, (e.g., rayon), carbon fibers, acrylic fibers, polyurethane fibers, cotton fibers and glass fibers, as well as mixtures of the foregoing. In a preferred embodiment, the fibers are para-aramids. The fibers may be of any suitable length, and are preferably in the range of from about 0.1 to about 10 mm, and may optionally be pulped to increase their surface area. The more preferred fiber length is from about 0.2 to about 7.5 mm, and the most preferred fiber length is from about 0.5 to about 3 mm. The fibers may moreover be otherwise treated as known in the art to improve their adhesion to the elastomer. In a preferred embodiment, the fibers are mechanically fibulated and may be combined with suitable resorcinol formaldehyde latex materials and/or other suitable adhesion systems that are compatible with the elastomer compound used to form the flexible coupling element. These systems and suitable methods of treating the fibers are all well known to the art. Fiber loading may be of any suitable level for the application and the particular type of loading material used, and is preferably in the range of from about 0 to about 50 parts by weight per 100 parts of elastomer ("phr") or more preferably from about 1 to about 30 phr, depending on the type of fiber used, and is more preferably in the range of from about 1 to about 10 phr, and is most preferably in the range of from about 2 to about 5 phr, for the type of fibers preferred in the practice of the present invention.

As a non-limiting illustration of the benefits of fiber loading in this context a comparative test was performed to ascertain the effect of fiber loading on the flexible coupling element's operating life time when subjected to an impulse analysis. For the test, a set of three flexible coupling elements (Samples A, B and C), each possessing the traditional trapezoidal tooth profile (according to DIN 7721 resp. DIN/ISO 6296), having a 60 mm outside diameter and a shell thickness of 7 mm, were formed from an elastomeric compound as described below in Table 1 and included a polyamide reinforcement layer and glass reinforcing cord over the inner surface thereof The elastomer material for the Sample Couplings A, B and C moreover included about 3 phr of para-aramid fibers, a substantial number of which were oriented circumferentially about the sleeve. Each coupling element included 12 teeth per coupling receiving portion, each such tooth having a base width of 5 mm and a height of about 2.5 mm. An additional set of three substantially similar flexible coupling elements (Comparative Samples 1, 2 and 3) were moreover formed from a substantially similar compound which was however not fiber loaded. Comparative Samples 1, 2 and 3 additionally included tire cord reinforcement along their inner surfaces. All of the coupling elements were subjected to an oscillating torsional test as provided in DIN 740, with total peak to peak amplitude in the range of from 90 to 130 Nm at a frequency of 9 Hz. Table 2 sets forth the conditions and results of the test.

TABLE 1

Flexible Coupling Element Elastomer Compound Formulation Samples A, B, C and Comparative Samples 1, 2 and 3

| Material | Parts per Hundred Rubber |
| --- | --- |
| Polychloroprene elastomer | 100 |
| Tetramethylthiuram monosulfide | 0.25 |
| Dibenzothiazoledisulphide | 1.5 |
| Precipitated silica | 10 |
| Carbon black | 54 |
| Stearic acid | 2 |
| Styrenated diphenylamine | 2 |
| N,N'-Diaryl-p-phenylenediamine | 1 |
| Paraffin wax | 2 |
| Zinc oxide | 5 |
| Magnesium oxide | 4 |

TABLE 2

Flexible Coupling Element Impulse Analysis

| | Sample "A" | Comparative Sample "1" | Sample "B" | Comparative Sample "2" | Sample "C" | Comparative Sample "3" |
| --- | --- | --- | --- | --- | --- | --- |
| Test Load applied | 128.0 Nm | 128.0 Nm | 117.5 Nm | 117.5 Nm | 95.4 Nm | 95.4 Nm |
| Time to Failure (hours) | 8.8 | 0.2 | 103.0 | 4.3 | 336.8 | 38.0 |

As can be seen from the results shown in Table 2, the fiber-loaded coupling elements, Samples A, B and C exhibited approximately ten to twenty fold increase in life over the Comparative coupling elements 1, 2 and 3 at equivalent loads under this test. Moreover, at 9 degrees displacement, the torsional stiffness of the fiber-loaded coupling elements moreover increased by an average of about 40% over the non-fiber-loaded coupling elements. In general, for equal life times and with all other parameters remaining the same, it is believed that the torque capacity of a given flexible coupling element may be increased by about 30% or more by fiber loading the elastomeric element of same in accordance with the present invention, over non-fiber-loaded elements.

The flexible coupling elements and coupling devices of the present invention may be formed according to any standard suitable method, which methods are generally well known to the art. These methods include that set forth in Case, U.S. Pat. No. 2,859,599, the contents of which are hereby incorporated by reference. The flexible coupling elements may also be formed according to standard methods well known to the art, wherein a suitable wear resistant fabric sleeve is placed in a toothed mold, reinforcement cord is optionally helically wound against the fabric, un-vulcanized elastomer material is applied to the outer surface of the fabric, the mold is placed in a suitable bladder and sufficient heat and pressure are applied to force the elastomer to flow through the tensile cords carrying the fabric into the mold grooves, and to vulcanize the elastomeric material, after which the thus-completed flexible coupling element is cooled and removed from the mold.

Figure 5:
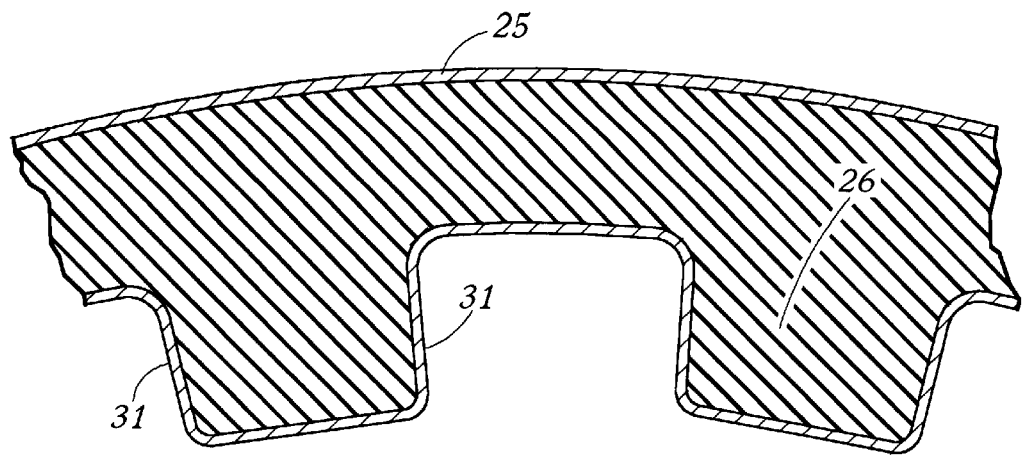
FIG. 5 is a fragmentary cross-sectional view of the tooth portion of the prior art flexible coupling element shown in FIG. 1 taken on line A—A thereof.

The traditional trapezoidal rib or tooth profile shown in FIGS. 1, 2 and 5 is characterized in ribs or teeth 26 having straight but sloping sides 31 and an included angle of approximately forty degrees. This configuration presents three conditions limiting the torque transmission capacity of the ribs. Firstly, the load transfer from the substantially rigid end piece grooves 30 into the mating portions of the generally elastomeric coupling receiving portion teeth 26 creates a stress concentration at the root of the elastomeric tooth at its juncture with the load carrying band 25 of the coupling element 24. This creates an excessive strain pattern in the tooth root, resulting in cracks that propagate circumferentially along the interface between the teeth and the sleeve body, leading to the premature failure of the sleeve as described above.

Secondly, the inclined or sloping sides 31 of the traditional tooth profile define ramps that transfer a component of the transmitted load into a radial direction. This radial component tends to expand the sleeve diameter, thereby increasing the tendency for the sleeve body to slip due to a ratcheting action in use.

Thirdly, the ratio between the widths of the teeth in the end pieces and the widths of the complementary teeth in the coupling receiving portion is out of proportion to the relative strengths and flexural stiffness of the materials typically used for the respective pieces. The far stiffer end piece teeth, normally formed of metal, are typically far wider in the trapezoidal cross-section-type coupling assembly than the less rigid, typically elastomeric flexible coupling element teeth. This is particularly problematic in that with time, and especially at high and low temperature extremes, the far greater mass and strength of the end piece teeth exhausts the smaller, weaker elastomeric teeth prematurely vis-a-vis the relatively high strength annular portion, as discussed above.

Figure 6:
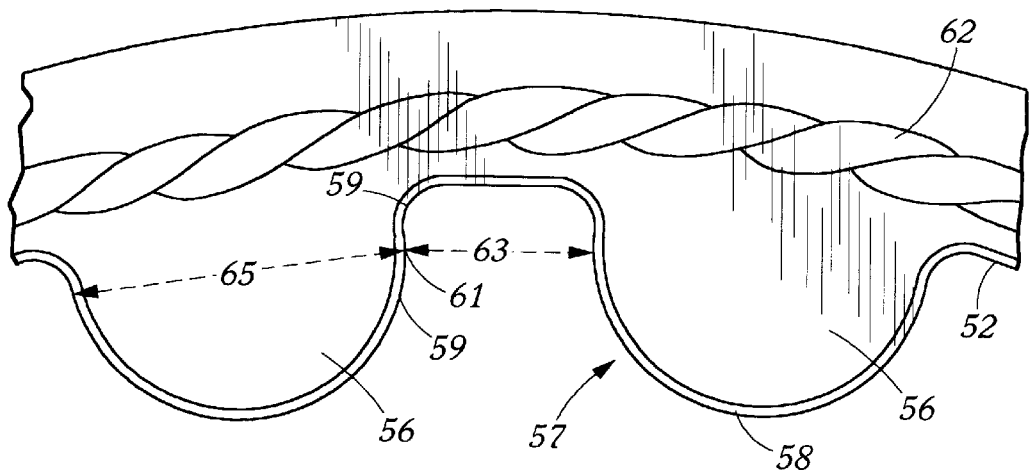
FIG. 6 is a fragmentary cross-sectional view of the tooth portion of the flexible coupling element of the present invention shown in FIG. 3, taken on line B—B thereof.

The embodiment of the present invention shown in FIGS. 3, 4 and 6 includes teeth 56 having a curvilinear profile or contour 57 shown generally. It has been surprisingly found that modifying the contour of the teeth from the traditional trapezoidal configuration to this curvilinear configuration, in which the contour of the tooth section is defined by a series of connected arcs 59 and tangents 61, presents the opportunity to significantly increase the torque transmission capacity, i.e., the load capacity of such coupling elements. In the preferred embodiment shown, the majority of the coupling receiving portion inner periphery profile is convex and mates with a predominantly concave end piece profile.

The curvilinear tooth profile preferred in the present invention, which along with the appropriately designed end piece profile are preferably substantially identical positive and negative forms, ensures a more even stress distribution over the mating pressure faces compared to prior art designs. This significantly reduces the localized strain at the sleeve tooth root and makes for more efficient utilization of the materials used. In addition, the rounded shape of the teeth having a radial orientation greatly reduces the outward radial load component, reducing the tendency of the coupling element to ratchet, thereby reducing slippage of the coupling.

In a preferred embodiment of the present invention, the ratio of the sum of the groove widths 63 to the sum of the tooth widths 65 for a given flexible coupling element receiving portion is less than about 0.65:1, is more preferably from about 0.50:1 to about 0.10:1, and is most preferably from about 0.45:1 to about 0.15:1. This ratio will hereinafter be referred to as the "groove/tooth ratio". As shown in FIG. 6, the width of the flexible element grooves 63 which alternate with the teeth 56 of such elements, is measured from a point where the groove radius becomes tangent 61 to the tooth radius.

To illustrate the increased operating life that can be expected from a flexible coupling of the present invention over prior art designs, a load capacity analysis was performed on samples of flexible coupling devices of the present invention and samples representing the prior art. The results of the test are set forth below in Table 3, wherein data obtained for samples representing an embodiment of the present invention are found under the column labeled "Sample Couplings", and data obtained for comparative samples representing the prior art are found under the column labeled "Comparative Sample Couplings". The load capacity analysis measured operating life in cycles to failure against peak torque (Nm), as set forth in Deutsch Industrie Norm ("DIN") 740. Four flexible coupling elements ("Sample Couplings") substantially as shown in FIG. 3 and having an outside diameter of 65 mm and a shell thickness of 6 mm were formed, wherein the sleeve-shaped bodies including the annular portions and the coupling receiving portions and teeth were formed of a polychloroprene vulcanizate into which helically wound glass fiber cords were embedded. The elastomer formula for these samples was substantially the same as that set forth in Table 1 above, but furthermore included about 3 phr of para-aramid fibers, a substantial number of which were oriented circumferentially about the elastomer sleeve. The inner surface of each body was covered with a wear resistant nylon fabric. Each of these coupling elements included a curvilinear tooth profile as described above, wherein the groove/tooth ratio was about 0.406. Each coupling receiving portion included eighteen teeth, each such tooth having a base width of about 5 mm and a height of about 3 mm. Four comparative flexible coupling elements ("Comparative Sample Couplings") having outside diameters of about 60 mm and shell thicknesses of about 7 mm were formed of materials substantially identical to those of the four samples described above. The comparative samples however possessed the traditional trapezoidal tooth profile as described above (i.e., following DIN 7721 (metric) resp. DIN/ISO 5296 (English pitch)) and as shown in FIG. 1, and had a groove/tooth ratio of about 0.65. Each comparative coupling receiving portion included twelve teeth, each such tooth having a base width of about 5 mm and a height of about 2.5 mm. The test was run on a torsional pulsating load tester and involved a peak to peak torque oscillation range of between about 90 and about 130 Nm at a rate of 9 Hz.

TABLE 3

Life in Cycles to Failure against Peak Torque Nm

| Life Cycles | Comparative Sample Couplings Peak torque Nm | Sample Couplings Peak torque Nm |
| --- | --- | --- |
| 1 | 120 | 300 |
| $10^2$ | 84 | 180 |
| $10^4$ | 55 | 120 |
| $10^6$ | 38 | 80 |

From a review of the data in Table 3, it is clear that testing over a range of oscillating torque conditions indicated a significant life improvement for the flexible coupling elements of the present invention over comparative samples of the prior art. At the 80 to 84 Nm range, the flexible coupling element of the present invention exhibited life cycles of the order of $10^6$ compared to the prior art coupling element life cycles of only $10^2$. Comparing life cycles at 120 Nm, the increase in life between the inventive and prior art couplings is similarly dramatic. Moreover, in all cases failure of the inventive flexible coupling elements was due to shear rupture of the main sleeve body, rather than the shearing off of the ribs, as was the characteristic failure mode of the trapezoidal-configured rib elements.

With respect to the test described in Table 2 above which illustrates the benefits of fiber-loading in flexible coupling elements possessing the traditional trapezoidal tooth profile, when fiber-loaded flexible coupling elements possessing the curvilinear tooth profile, and which were substantially identical to the Sample Couplings described above for Table 3, were similarly compared to the fiber-loaded trapezoidal flexible coupling elements (i.e., Samples A, B and C), even more significant benefits were discovered. For example, when tested at 128.0 Nm, the fiber-loaded flexible coupling elements having the curvilinear tooth profile ran for 1050 hours compared to 8.8 hours for the similarly fiber-loaded trapezoidal Sample A. Moreover, at 170 Nm, fiber-loaded flexible coupling elements having the inventive curvilinear tooth profile ran for 25 hours.

Since the shear capacity of the cumulative tooth area exceeds that of the annular portion of the flexible coupling element of the present invention, the present invention makes it now possible to include a torque-level indicator means on the outer body of the elastomeric sleeve to illustrate the current condition of the element, as well as to predict the useful life remaining in the coupling assembly. That is, since the mode of failure of the flexible coupling elements of the present invention is generally no longer the shearing-off of the teeth as in prior art designs, but the distortion and eventual rupture of the actual sleeve body, indicator means may be utilized on the outer surface of the sleeve body to show the level of torque being transmitted through the coupling at any given time. This furthermore enables one to ascertain the proportion of useful life remaining in the coupling element without requiring halting of operation, removal from the drive assembly and visual inspection of the coupling element.

Suitable indicator means may include any type of pattern or graphic on the surface of the sleeve body which may be viewed either instrumentally or with the naked eye, and which exhibits predictable, reproducible changes or characteristics as the coupling element moves from its at rest condition through varying levels of torque transmission.

Figure 8:
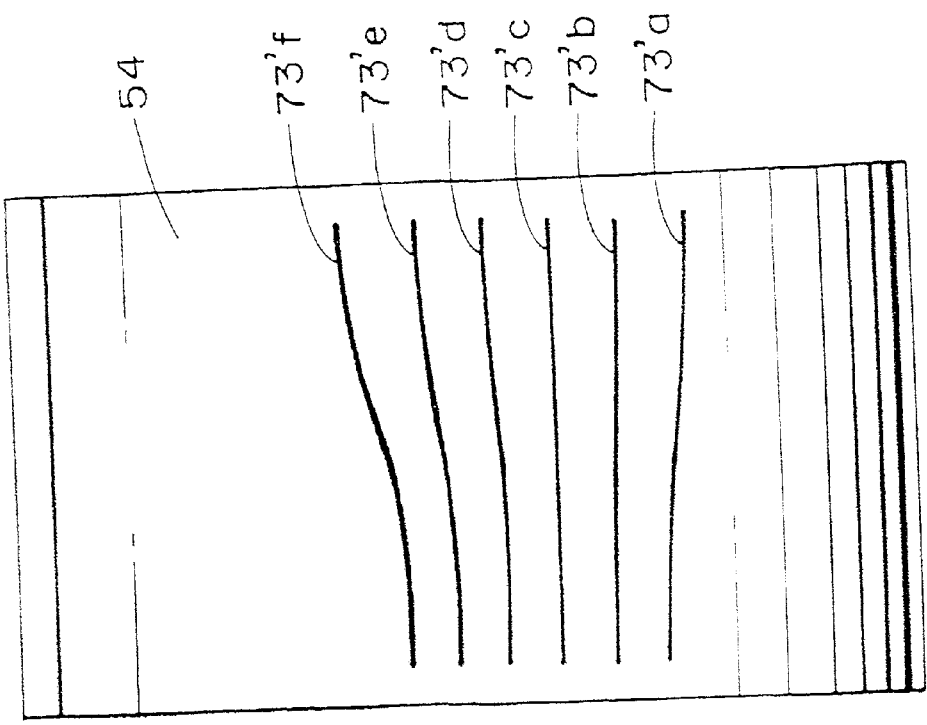
FIG. 8 is a side view of the flexible coupling element of FIG. 7, wherein the flexible coupling element is shown under no applied torsional load.
Figure 7:
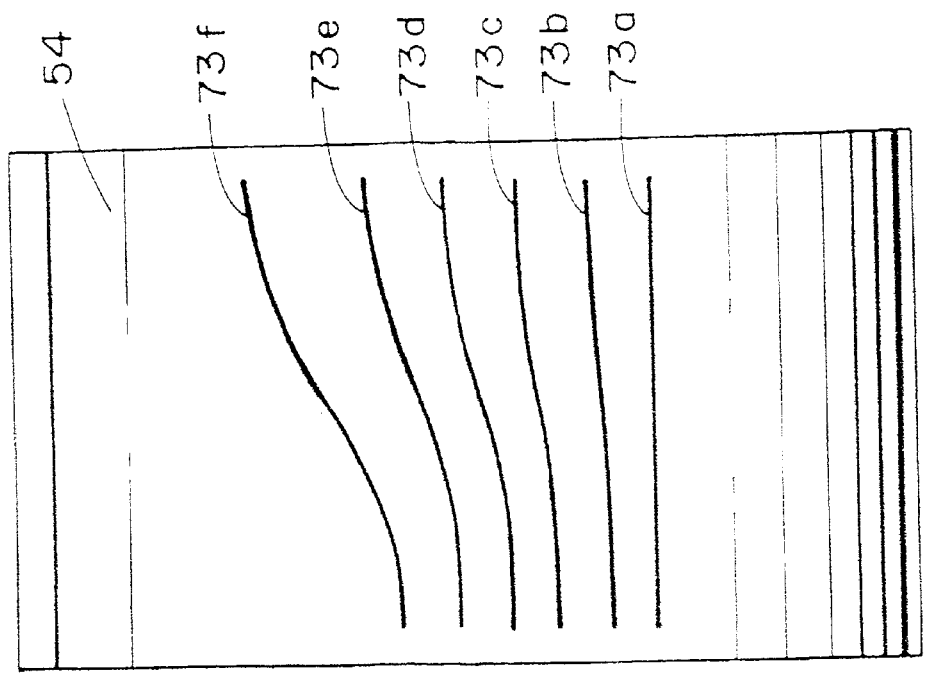
FIG. 7 is a side view of one embodiment of the present invention in the form of a flexible coupling element including indicator means on the outer surface thereof, and wherein the element is shown under an applied load.

In a preferred embodiment shown in FIG. 7 and FIG. 8 such indicator means comprise the incorporation on the outer surface 54 or periphery of the elastomeric sleeve of a graphic, being designed to utilize the distortion of the outer surface of the elastomeric sleeve under varying torque conditions. The design is such that at predetermined torque conditions, elements within the graphic become aligned due to the surface distortion, producing a clearly recognizable visible indicator of the pertaining torque level. The graphic may then be viewed while the coupling is operating, optionally with the aid of a stroboscope or other suitable instrument to freeze the image of the graphic on the rotating sleeve. One typical form of a suitable graphic is shown in FIG. 7 and FIG. 8 wherein a series of complex curved lines 73a, b, c, d, e, f and 73'a, b, c, d, e, f are formed on the outer surface 54 of the elastomeric sleeve. Each curved line shows progressively more variation from the straight line 73', reflecting the increasing surface distortion of the elastomeric sleeve with increasing torque transmission levels. FIG. 8 shows the same flexible coupling element as that of FIG. 7, but in the case of FIG. 7, the flexible element is shown under torsional load and in FIG. 8 it is shown at rest, i.e., under no applied load. Thus, the torsional load experienced by the flexible element at any given time would be reflected in the configuration of the graphic at that particular time.

The curved line graphics used in the embodiment shown in FIGS. 7 and 8 are designed so that at each specified torque level, the corresponding curved line is transformed into a straight line. As at any given torque level only one line will be straight, it will be very easily recognized and hence the corresponding operating torque level inferred. Moreover, the lines in the graphic may be so designed as to indicate safe working, over load and premature failure conditions. These conditions can be further emphasized by the use of, e.g., color coding. As a non-limiting example, a red line in the straight-line configuration could indicate over load, while a green line in such configuration could indicate safe working conditions.

The outer graphic element has also been found to be capable of indicating the progressive deterioration of the elastomeric sleeve. Since heretofore, failure occurred on the inside, i.e., at the tooth area of the sleeve, and did not involve the destruction of the outer sleeve element, such indicator means was not practical or useful. In the present case however, as the elastomeric sleeve structure deteriorates with use, the surface distortion increases, resulting in graduated graphic changes. Such changes may be used to plan for the replacement of a given coupling element at the most economic time and thus reduce or eliminate unplanned production shut-down.

The indicator means may be of any appropriate style or form, and it is foreseen that it may incorporate features not described above, including numerics or other symbols indicating torque levels, and/or warning messages that can be designed to become increasingly legible as the corresponding torque level is reached. Moreover, the indicator means may be incorporated on the surface of the sleeve element in a wide variety of ways including in addition to the manner described above, molding directly on the sleeve during manufacture, printing onto the sleeve after molding is completed, or by the attachment of a pre-printed or pre-molded element to the sleeve surface.

The unique design of the flexible shaft coupling devices of the present invention, whereby the flexible coupling element has been formed and adapted so that the shear capacity of the cumulative tooth shear area exceeds that of the annular portion, results in a coupling which exhibits improved torsional stiffness and load capacity and increased operational life over prior art designs. This unique characteristic also makes it possible and desirable to include torsional load indicator means as described above to ascertain current performance levels and predict future performance of the couplings. In a preferred embodiment, fiber loading of the elastomer used to form the elastomeric portions of the coupling in the manner described above further improves the performance of the inventive couplings. The unique curvilinear tooth profile and groove/tooth ratios provided by one embodiment of the present invention further improve the performance of the couplings to a degree which is truly unexpected.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A flexible element for a flexible shaft coupling device, comprising a generally sleeve-shaped body and being formed of an elastomeric compound; said sleeve-shaped body comprising at least two opposing sleeve end portions defining respective coupling receiving portions; and at least one of a fabric reinforcement element bonded to at least a portion of the inner periphery of said sleeve-shaped body, and a helically wound tensile cord; an annular portion between said coupling receiving portions; an inner periphery and an outer periphery; said coupling receiving portions each comprising a plurality of axially extending teeth arranged along at least a portion of said inner periphery, each of said teeth of each of said coupling receiving portions possessing a circumferential width spanning a portion of said inner periphery; and characterized in that:

said annular portion possesses a torsional shear capacity;

each of said teeth of each of said coupling receiving portions possesses an active axial length which in conjunction with each said circumferential width defines a tooth shear area, and wherein the sum of said tooth shear areas defines a cumulative tooth shear area, said cumulative tooth shear area having a cumulative tooth shear capacity;

and said cumulative tooth shear capacity exceeds said annular portion torsional shear capacity.

2. The flexible element of claim 1, wherein at least one of said teeth possesses a curvilinear cross-sectional profile.

3. The flexible element of claim 1, wherein said teeth are in alternating arrangement with a plurality of grooves, each of said grooves having a width spanning a portion of the circumference of the sleeve-shaped body inner periphery, and wherein the ratio of the sum of said groove widths to the sum of said tooth widths is less than 0.65:1.

4. The flexible element of claim 3 wherein the ratio of said sum of said groove widths to said sum of said tooth widths from 0.5:1 to 0.10:1.

5. The flexible element of claim 3 wherein the ratio of said sum of said groove widths to said sum of said tooth widths is from 0.45:1 to 0.15:1.

6. The flexible element of claim 1 wherein said elastomeric compound comprises an elastomeric material and from about 1 to about 30 phr of fibers.

7. The flexible element of claim 6 wherein at least a portion of said fibers are oriented substantially circumferentially about said sleeve body.

8. A flexible element for a flexible shaft coupling device, comprising a generally sleeve-shaped body and being formed of an elastomeric compound; said sleeve-shaped body comprising at least two opposing sleeve end portions defining respective coupling receiving portions; an annular portion between said coupling receiving portions; an inner periphery and an outer periphery; said coupling receiving portions each comprising a plurality of axially extending teeth arranged along at least a portion of said inner periphery, each of said teeth of each of said coupling receiving portions possessing a circumferential width spanning a portion of said inner periphery; and characterized in that:

said flexible element further comprises at least one torque level indicating means on said outer periphery of said sleeve body;

said annular portion possesses a torsional shear capacity;

each of said teeth of each of said coupling receiving portions possesses an active axial length which in conjunction with each said circumferential width defines a tooth shear area, and wherein the sum of said tooth shear areas defines a cumulative tooth shear area, said cumulative tooth shear area having a cumulative tooth shear capacity:

and said cumulative tooth shear capacity exceeds said annular portion torsional shear capacity.

9. The flexible element of claim 8 wherein said torque level indicator means is in the form of graphic elements which form a first pattern on said outer periphery of said sleeve-shaped body at rest, and a second pattern on said outer periphery of said sleeve-shaped body under surface distortion.

10. A flexible shaft coupling device comprising a flexible element and at least two substantially rigid end pieces coupled to said flexible element; said flexible element comprising a generally sleeve-shaped body and being formed of an elastomeric compound; said sleeve-shaped body comprising at least two opposing sleeve end portions defining respective coupling receiving portions; and at least one of a fabric reinforcement element bonded to at least a portion of the inner periphery of said sleeve-shaped body, and a helically wound tensile cord; an annular portion between said coupling receiving portions; an inner periphery and an outer periphery; said coupling receiving portions each comprising a plurality of axially extending teeth arranged along at least a portion of said inner periphery, each of said teeth of each of said coupling receiving portions possessing a circumferential width spanning a portion of said inner periphery; and characterized in that:

said elastomeric compound comprises an elastomeric material and from about 0 to about 50 phr of fibers;

said annular portion possesses a torsional shear capacity;

each of said teeth of each of said coupling receiving portions possesses an active axial length which in conjunction with each said circumferential width defines a tooth shear area, and wherein the sum of said tooth shear areas defines a cumulative tooth shear area, said cumulative tooth shear area having a cumulative tooth shear capacity;

and said cumulative tooth shear capacity exceeds said annular portion torsional shear capacity.

11. The coupling device of claim 10 wherein said substantially rigid end pieces comprise a series of axially extending grooves which are complementary forms of said teeth of said coupling receiving portions for engagement of the end pieces with the coupling receiving portions.

12. The flexible shaft coupling device of claim 10 wherein said elastomeric compound comprises said elastomeric material and from about 1 to about 30 phr of fibers, at least a portion of which are oriented substantially circumferentially about said sleeve body.

13. The flexible shaft coupling device of claim 10 wherein said fibers are of a type selected from the group consisting of:

a) aramid fibers;

b) polyester fibers;

c) polyamide fibers d) cellulose fibers;

e) carbon fibers;

f) acrylic fibers;

g) polyurethane fibers;

h) cotton fibers;

i) glass fibers; and j) a combination of any of at least two of the foregoing.

* * * * *